(12) United States Patent
Runge et al.

(10) Patent No.: US 12,176,958 B2
(45) Date of Patent: Dec. 24, 2024

(54) METHOD AND PHOTODIODE DEVICE FOR THE COHERENT DETECTION OF AN OPTICAL SIGNAL

(71) Applicant: Fraunhofer-Gesellschaft zur Förderung der angewandten Forschung e.V., Munich (DE)

(72) Inventors: Patrick Runge, Berlin (DE); Francsico Soares, Berlin (DE); Pascal Rustige, Berlin (DE); Jan Krause, Potsdam (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 97 days.

(21) Appl. No.: 17/802,731

(22) PCT Filed: Feb. 26, 2021

(86) PCT No.: PCT/EP2021/054822
§ 371 (c)(1),
(2) Date: Aug. 26, 2022

(87) PCT Pub. No.: WO2021/170798
PCT Pub. Date: Sep. 2, 2021

(65) Prior Publication Data
US 2023/0080233 A1   Mar. 16, 2023

(30) Foreign Application Priority Data
Feb. 28, 2020   (DE) .................... 10 2020 105 353.3

(51) Int. Cl.
*H04B 10/61*   (2013.01)
*H04B 10/67*   (2013.01)

(52) U.S. Cl.
CPC .......... *H04B 10/67* (2013.01); *H04B 10/616* (2013.01)

(58) Field of Classification Search
CPC ............................... H04B 10/61; H04B 10/67
See application file for complete search history.

(56) References Cited

U.S. PATENT DOCUMENTS

| | | | |
|---|---|---|---|
| 6,370,292 B1* | 4/2002 | Strake | G02B 6/10 385/14 |
| 2003/0047752 A1 | 3/2003 | Campbell et al. | |

(Continued)

OTHER PUBLICATIONS

J. Heath, "Basics of bandpass filters", Analog IC Tips, May 24, 2017 (Year: 2017).*

(Continued)

*Primary Examiner* — Shi K Li
(74) *Attorney, Agent, or Firm* — The Webb Law Firm

(57) ABSTRACT

Provided is a device which includes a method for the coherent detection of an optical signal, including the following steps of providing a vertically illuminable photodiode; producing an optical reference signal; radiating the optical signal and the reference signal into the photodiode in such a way that the two signals at least partially interfere with each other. Radiating the optical signal into the photodiode is effected via a first side of the photodiode, and radiating the reference signal into the photodiode is effected via a second side of the photodiode, or, vice versa, the reference signal is radiated into the photodiode via the first side of the photodiode and the optical signal is radiated into the photodiode via the second side.

17 Claims, 2 Drawing Sheets

(56) References Cited

U.S. PATENT DOCUMENTS

| | | | | |
|---|---|---|---|---|
| 2004/0264839 | A1* | 12/2004 | Suzuki | G02B 26/105 |
| | | | | 385/14 |
| 2007/0264028 | A1* | 11/2007 | Yuki | H04B 10/5057 |
| | | | | 398/183 |
| 2008/0019252 | A1* | 1/2008 | Usami | G11B 7/083 |
| 2009/0078973 | A1 | 3/2009 | Hsu et al. | |
| 2009/0283680 | A1* | 11/2009 | Logan, Jr. | G01J 3/42 |
| | | | | 250/339.07 |
| 2012/0269514 | A1* | 10/2012 | Nedovic | H04B 10/801 |
| | | | | 398/66 |
| 2016/0049528 | A1 | 2/2016 | Cho et al. | |
| 2018/0358393 | A1 | 12/2018 | Sato et al. | |
| 2019/0391006 | A1 | 12/2019 | Pelletier et al. | |

OTHER PUBLICATIONS

Chang et al., "High-power dual-fed traveling wave photodetector circuits in silicon photonics", Optics Express, Aug. 2015, pp. 22857-22866, vol. 23:17.

Jafar et al., "Evaluation of coverage area for a wide line-of-sight indoor optical free-space communication system employing coherent detection", IET Commun., 2008, pp. 18-26, vol. 2:1.

Kaiser et al., "Monolithically integrated polarisation diversity heterodyne receivers on GaInAsP/InP", IEE Electronic Letters, Aug. 1994, pp. 1446-1447, vol. 30:17.

Paschotta, "Optical Heterodyne Detection", RP Photonics Encyclopedia, pp. 1-7. Retrieved from https://www.rp-photonics.com/optical_heterodyne_detection.html. [Acccessed Feb. 19, 2020].

Strauss, "Synthetic-array heterodyne detection: a single-element detector acts as an array", Optics Letters, Oct. 1994, pp. 1609-1611, vol. 19:20.

\* cited by examiner

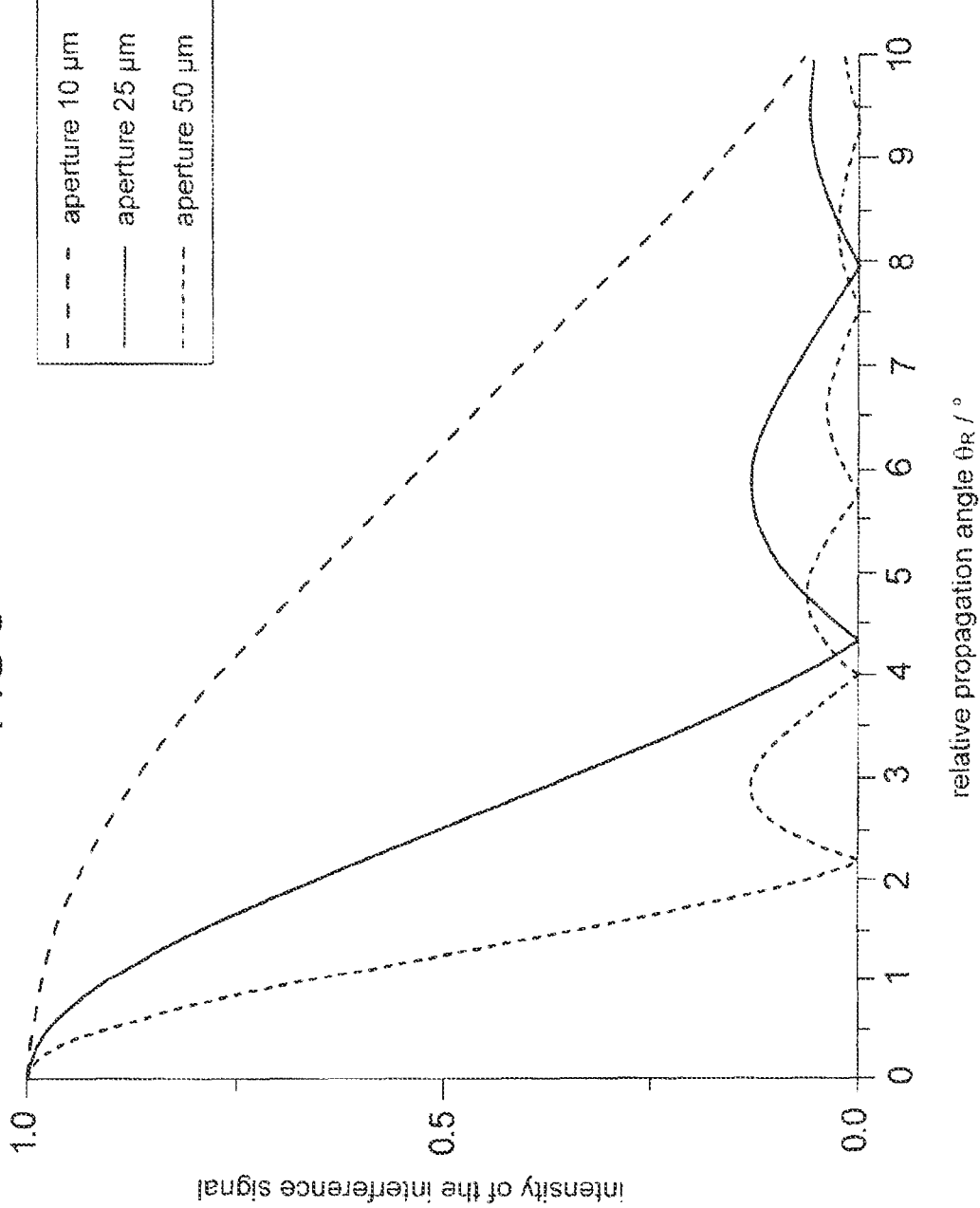

METHOD AND PHOTODIODE DEVICE FOR THE COHERENT DETECTION OF AN OPTICAL SIGNAL

CROSS-REFERENCE TO RELATED APPLICATIONS

This application is the United States National Phase of International Patent Application Number PCT/EP2021/054822, filed Feb. 26, 2021, which claims priority to German Patent Application Number 10 2020 105 353.3, filed Feb. 28, 2020, the disclosures of which are hereby incorporated by reference in their entirety.

BACKGROUND OF THE INVENTION

Field of the Invention

The disclosure relates to a method for the coherent detection of an optical signal and to a photodiode device for the coherent detection of an optical signal.

Description of Related Art

For the coherent detection of optical signals there are usually employed waveguide-integrated photodiodes, wherein a homodyne or heterodyne mixture of the optical signal with a reference signal (the local-oscillator signal) is effected by means of a directional coupler or an MMI (multimode interference coupler). Such an arrangement is described for example in the article "Monolithically integrated polarisation diversity heterodyne receivers on GaInAsP/InP", R. Kaiser et al., Electronics Letters 30 (17), 1446 (1994). However, the possible applications of such an arrangement are limited. In particular, they cannot be combined to form 2D arrays, which are necessary for example for imaging methods. It is likewise known to couple the optical signal and the reference signal into a photodiode by using a beam splitter. However, such arrangements likewise can only be used to a limited extent.

SUMMARY OF THE INVENTION

The problem underlying the proposed solution consists in indicating a possibility of coherent detection which is applicable as flexibly as possible.

This problem is solved by providing the method with features as described herein and the device with features as described herein.

Accordingly, there is provided a method for the coherent detection of at least one optical signal, comprising the following steps:
 providing at least one vertically illuminable photodiode;
 producing at least one optical reference signal;
 radiating the optical signal and the reference signal into the photodiode in such a way that the two signals at least partially interfere with each other, wherein radiating the optical signal into the photodiode is effected via a first side of the photodiode, and radiating the reference signal into the photodiode is effected via a second side of the photodiode, or, vice versa, the reference signal is radiated into the photodiode via the first side of the photodiode and the optical signal is radiated into the photodiode via the second side.

The optical signal (the optical wave, in particular in the form of the optical beam) and the reference signal (the local-oscillator signal, which likewise can be in the form of an optical beam) thus are radiated into the photodiode via different sides of the same. For example, the optical signal and the reference signal each are radiated into the photodiode through one side of the photodiode. It is conceivable that the optical signal is radiated into the photodiode through a substrate or a lower layer (in particular in the form of a semiconductor layer, e.g. a contact layer) of the photodiode, and the reference signal is radiated into the photodiode through an upper layer (in particular in the form of a semiconductor layer; e.g. a contact layer) of the photodiode. The reverse case also is possible, according to which the reference signal is radiated into the photodiode through a substrate or a lower layer of the photodiode, and the optical signal is radiated into the photodiode through an upper layer.

As already mentioned above, the reference signal is a local-oscillator signal. Other than the reference signal, the optical signal can have a data signal applied to it and/or have other characteristics (in particular an amplitude, frequency and/or phase response) which are not present in the reference signal. The method according to the solution in particular also comprises a coherent (homodyne or heterodyne) detection of the optical signal by using an interference signal produced by the interference of the optical signal with the reference signal and registered by the photodiode; in particular by using an electrical photodiode signal that is produced by the photodiode on receipt of the interference signal.

This for example allows greater flexibility in the guidance of the signals and in particular provides for the arrangement of several photodiodes in an array. It is conceivable that radiating the signals is effected without use of a beam splitter. For example, the optical signal and the reference signal are radiated into the photodiode at least substantially collinearly.

The vertically illuminable photodiode is configured such that the optical signal to be detected is radiated in vertically, i.e. in particular perpendicularly to a substrate of the photodiode. The first side in particular faces away from the second side of the photodiode, wherein the two sides for example extend at least approximately parallel to each other. It is possible that the first side represents an underside of the photodiode and for example is formed by the substrate mentioned already or by a semiconductor layer (for example a contact layer) of the photodiode arranged on a substrate. Correspondingly, the second side can form an upper side of the photodiode, wherein the upper side likewise can be formed by a side of a semiconductor layer of the photodiode (for example likewise in the form of a contact layer).

The optical signal and/or the reference signal for example are radiated in at an angle relative to the substrate or semiconductor layer. For example, the optical signal and/or the reference signal are radiated in at least approximately perpendicularly to the substrate or the semiconductor layer.

In addition, the optical signal and the reference signal are radiated into the photodiode in particular such that they are at least partially superimposed in an absorber layer of the photodiode. It is possible that the thickness of the absorber layer is optimized with regard to the detection efficiency of the photodiode.

The photodiode in particular is a p-i-n diode; for example in the form of an avalanche photodiode (known per se). It is conceivable that the optical signal and the reference signal are superimposed in particular in an absorber layer and/or multiplier layer of the avalanche photodiode.

The photodiode can be used in particular for the homodyne detection, in which the wavelengths of the optical signal and the reference signal are at least approximately the same. It is also conceivable, however, that the photodiode is used for heterodyne detection, wherein the wavelengths of the optical signal and the reference signal are different. The optical signal and the reference signal for example are produced (in particular in the case of the homodyne detection) by means of the same optical light source (in particular in the form of a laser).

It is possible that the reference signal and/or the optical signal is radiated in via an adjustable deflection unit, wherein the photodiode registers an interference signal produced by the interference of the optical signal with the reference signal, which substantially depends on a fraction of the optical signal that is incident on the photodiode collinearly to the reference signal. By using the adjustable deflection unit it is possible in particular that the reference signal and/or the optical signal are radiated into the photodiode at a specifiable angle relative to each other. In particular, by varying the angle of incidence of the reference signal the spatial direction of the reference signal can be adjusted to the direction of the optical signal. The adjustable deflection unit comprises a MEMS, for example.

It is also conceivable that the reference signal is radiated in diffusely, in particular to be able to detect optical signals from different spatial directions.

The photodiode for example has an aperture which amounts to at least 0.5 mm or at least 1 mm. Such a large aperture can result in a strong angular dependence of the interference signal produced by the interference of the optical signal with the reference signal and registered by the photodiode.

According to another embodiment of the method of the solution, the reference signal is radiated in at different angles relative to the first or second side of the photodiode (e.g. by means of the adjustable deflection device explained above) for spatial scanning of the optical signal, wherein for each of the angles an electrical signal of the photodiode is registered. The detector signal with respect to the optical signal is greatest when the reference signal is directed collinearly to the optical signal, so that by varying the angle of incidence of the reference signal information on the direction of the optical signal can be determined and/or the detection of the optical signal is performed in a direction-selective way ("beam steering"). In particular, an interference signal, i.e. a signal that depends on the interference of the optical signals, is registered for each of the angles. It is conceivable that the optical signal consists of a bundle of rays (e.g. a diverging bundle), which covers a certain solid angle range around a central angle of incidence. In this case, the registered interference signal above all (in particular for the most part, at least approximately substantially) depends on a fraction of the optical signal which is incident on the photodiode collinearly to the reference signal.

It is conceivable that a plurality of optical signals is radiated in from different solid angles, wherein the aperture of the photodiode is chosen in such a way that the normalized intensity of the interference signal (normalized for the collinear incidence of the optical signal and of the reference signal) from among incident optical signals not to be detected from solid angles outside a specified solid angle resolution is not greater than 0.1 or greater than 0.05. The "solid angle resolution" is a solid angle range from which optical signals are to be detected by means of the photodiode. The orientation of this solid angle range can be changed by changing the direction of the reference signal, in order to scan a visual range (a larger solid angle segment). For example, the photodiode (in particular its aperture) is designed such that the normalized intensity of the interference signal outside a solid angle range (the "solid angle resolution") of 0.1°, 0.5° or 1° is less than 0.1 or 0.05.

For example, there is provided an array of photodiodes, wherein the optical signal is each radiated into the photodiodes via the first or the second side and the reference signal is each radiated in via the other side of the photodiodes, wherein each of the photodiodes registers an interference signal produced by the interference of the optical signal with the reference signal, which above all depends on a fraction of the optical signal which is incident on the photodiode collinearly to the reference signal. It is conceivable in particular that by means of the array an optical signal is registered, which comprises a bundle of rays covering a solid angle range, wherein the detector signal substantially depends on the fraction of the optical signal (of the bundle of rays) collinear to the reference signal.

The at least one optical signal is radiated into the photodiodes in particular by means of at least one beam-shaping element, e.g. a (e.g. concave) lens or a lens array. It is conceivable that the at least one beam-shaping element is configured and arranged such that at least some of the photodiodes receive optical signals from different solid angle ranges.

The solution also relates to a photodiode device for the coherent detection of at least one optical signal, in particular for carrying out the method of the solution, comprising
at least one vertically illuminable photodiode; and
a light irradiating device for radiating an optical signal and a reference signal into the photodiode in such a way that the two signals at least partially interfere with each other, wherein
the light irradiating device is configured such that the optical signal entering into or impinging on the light irradiating device is radiated into the photodiode via a first side of the photodiode and that the reference signal entering into or impinging on the light irradiating device is radiated into the photodiode via a second side of the photodiode, or, vice versa, the reference signal is radiated in via the first side and the optical signal is radiated in via the second side.

For example, the light irradiating device comprises a first deflection device for deflecting the optical signal or the reference signal and a second deflection device for deflecting the reference signal. It is conceivable that the first and/or the second deflection device comprises at least one reflective element (in particular a surface acting as a mirror). It is also possible that the first and/or the second deflection device includes a lens or another diffractive element. It is also possible that the photodiode device comprises an adjustable deflection device, as already explained above.

Furthermore, the light irradiating device can comprise a waveguide for guiding the optical signal, wherein for example the first deflection device is formed by an end face of the waveguide. For example, the waveguide is an optically integrated waveguide, i.e. a waveguide that is formed by at least one semiconductor layer arranged on a substrate. It is conceivable that the light-diverting end face of the optically integrated waveguide is formed by a cutout (in particular extending at an angle) in the semiconductor layer and/or the substrate.

Furthermore, the exemplary embodiments described above in connection with the method of the solution can also be used for developing the photodiode device of the solution. For example, the photodiode device comprises an evaluation unit or can be coupled with such a unit, to which an electrical photodiode signal can be supplied, which depends on an interference signal produced by the interference of the optical signal with the reference signal and registered by the photodiode.

With reference to this photodiode signal a coherent (homodyne or heterodyne) detection of the optical signal is effected by means of the evaluation unit.

The solution also relates to an array comprising a plurality of photodiode devices according to the solution. Such an array can be used for example as an imaging sensor; for example in connection with a LIDAR system (such as an FMCW—Frequency Modulated Coherent—LIDAR system). For example, the light irradiating devices of the photodiode devices of the array are designed and arranged such that the photodiodes of a plurality of the photodiode devices can be illuminated with the same reference signal.

BRIEF DESCRIPTION OF THE DRAWINGS

The proposed solution will be explained in detail below by means of exemplary embodiments with reference to the Figures.

FIG. 3 shows the normalized intensity of the interference signal to be detected in dependence on the angular difference between the direction of the optical signal and the reference signal.

DESCRIPTION OF THE INVENTION

Figure 1:
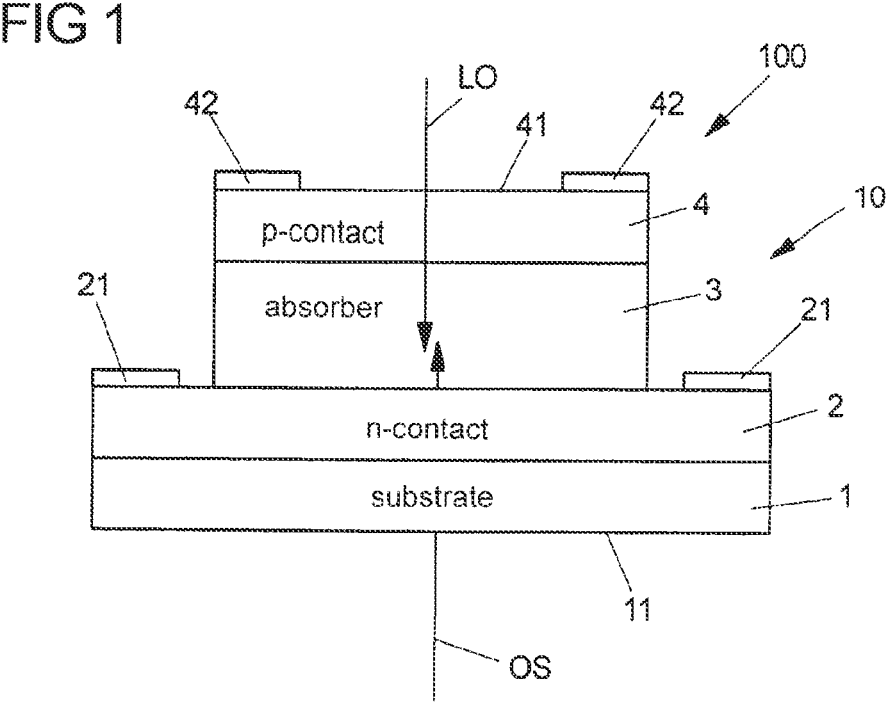
FIG. 1 schematically shows a photodiode device for the coherent detection according to a first exemplary embodiment of the solution.

The photodiode device 100 according to the solution as shown in FIG. 1 for the coherent detection of an optical signal OS comprises a photodiode 10. The photodiode 10 includes a plurality of semiconductor layers 2 to 4 arranged one above the other on a substrate 1. The lowermost layer 2 represents an n-doped contact layer, while the uppermost layer 4 is a p-doped contact layer. Between the two contact layers 2, 4 the absorber layer 3 is disposed, so that the layers 2 to 4 form a p-i-n junction. Alternatively, it is possible that the n-doped contact layer is arranged above the absorber layer 3 and the p-doped contact layer extends below the absorber layer 3 adjacent to the substrate 1. For electrically contacting the n-contact layer 2 n-contacts 21 are used, while the p-contact layer 4 is contacted via p-contacts 42.

The photodiode device 100 furthermore comprises a light irradiating device (not shown in FIG. 1) by means of which the optical signal OS to be detected is coupled into the photodiode 10 via a first side of the photodiode 10, namely via an underside 11 of the substrate 1 (through the underside 11). By means of the light irradiating device a reference signal in the form of a local-oscillator signal LO furthermore is coupled into the photodiode 10 via a second side of the same (through the second side). The second side of the photodiode 10 is formed by its upper side, i.e. by an outwardly facing side 41 of the p-contact layer 4. It is of course also possible that the optical signal OS conversely is coupled into the photodiode 10 via the upper side of the photodiode 10, i.e. the side 41 of the layer 4, and the local-oscillator signal LO is coupled into the photodiode 10 via its underside, i.e. the side 11 of the substrate 1.

Thus, the optical signal OS is mixed with the local-oscillator signal LO in the manner of the coherent detection. At the same time, there is produced a detector signal (photodiode signal) dependent on the mixed signal formed by this mixture. With reference to this detector signal, properties of the optical signal OS can be determined in the manner of the coherent detection known per se. In particular, the photodiode device according to the solution also comprises an evaluation unit for evaluating the detector signal. It is also conceivable that, as already explained above, the direction of incidence of the local-oscillator signal LO is changed in order to obtain information with respect to the direction of the optical signal OS or to perform the detection in a direction-selective manner.

Figure 2:
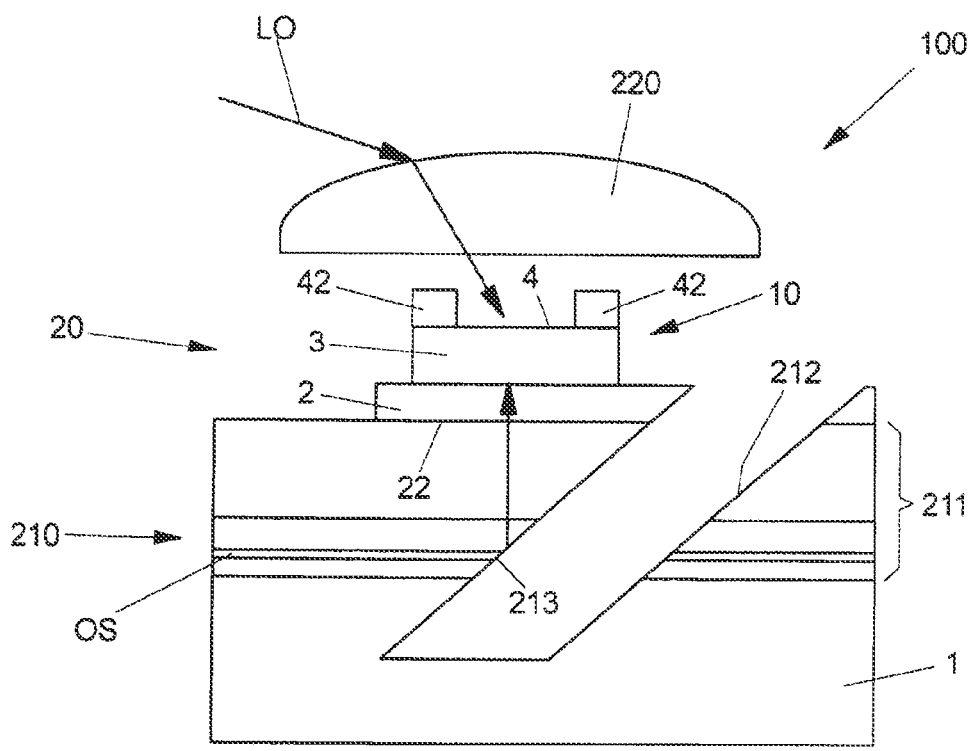
FIG. 2 shows a photodiode device for the coherent detection according to a second exemplary embodiment of the solution.

FIG. 2 shows a more concrete exemplary embodiment of the photodiode device 100 according to the solution. Analogous to FIG. 1, the photodiode 10 of the photodiode device 100 includes an n-doped contact layer (n-contact layer 2) and a p-doped contact layer (p-contact layer 4), between which an absorber layer 3 is disposed.

The light irradiating device 20 of the photodiode device 100 comprises an optically integrated waveguide 210 formed by semiconductor layers 211 arranged on the substrate 1, into which the optical signal OS to be detected is coupled. A cutout 212 extends through the semiconductor layers 211 of the waveguide 210 (and for example also through the n-contact layer 2). The cutout 212 extends at an angle to the substrate 1 and the waveguide 210 (for example at an angle of 45°) so that the waveguide 210 has an end face 213 adjacent to the cutout 212 and extending at this angle. This end face 213 forms a first deflection device in the form of a deflecting surface which diverts the light of the optical signal OS guided in the waveguide 210 by an angle dependent on the course of the cutout 212 (in the present case 90) in the direction of the photodiode 10. Thus, the optical signal OS in turn enters into the photodiode 10 via an underside of the photodiode 10, which in this case is formed by an underside 22 of the n-contact layer 2.

Furthermore, the light irradiating device 20 comprises a second deflection device in the form of a (for example cylindrical) lens 220. The lens 220 is arranged such that the local-oscillator signal LO radiated into the same is deflected in the direction of the upper side of the photodiode 10, i.e. the upper side 41 of the p-contact layer 4, and is coupled into the photodiode 10 via the side 41 of the p-contact layer 4. Analogous to FIG. 1, a superposition of the optical signal OS and the local-oscillator signal LO occurs in the absorber layer 3. It is also conceivable here that the direction of incidence of the local-oscillator signal LO is varied in order to spatially scan the optical signal OS.

As already mentioned in connection with FIG. 1, the optical signal OS and the local-oscillator signal LO can of course also be interchanged, i.e. the local-oscillator signal LO might be coupled into the photodiode 10 via the waveguide 210, and the optical signal OS might be coupled into the photodiode 10 via the lens 220.

Furthermore, instead of the illustrated conventional photodiode there might also be used an avalanche photodiode which in addition to the absorber layer contains a multiplier layer, among other things. It is also possible that several of the photodiode devices 100 of FIGS. 1 and 2 are connected to form an array, in order to realize for example an imaging sensor.

FIG. 3 shows the normalized intensity (relative to a collinear incidence of the optical signal and the reference signal) of the interference signal to be detected in dependence on the angular difference ("relative propagation angle") between the direction of the optical signal and the direction of the reference signal for different apertures of the photodiode or a lens upstream of the photodiode. For all apertures, the intensity of the interference signal decreases with increasing angular difference, with the intensity curve dropping most steeply for the smallest aperture (10 µm).

The invention claimed is:

1. A method for the coherent detection of at least one optical signal, comprising the steps of:
providing at least one vertically illuminable photodiode;
producing at least one optical reference signal; and
radiating the optical signal and the reference signal into the photodiode in such a way that the two signals at least partially interfere with each other,
wherein radiating the optical signal into the photodiode is effected via a first side of the photodiode, and radiating the reference signal (LO) into the photodiode is effected via a second side of the photodiode, or, vice versa, the reference signal is radiated into the photodiode via the first side of the photodiode and the optical signal is radiated into the photodiode via the second side,
wherein for spatially scanning the optical signal the reference signal is radiated in at different angles relative to the first or second side of the photodiode and for each of the angles an interference signal is registered by the photodiode, or
wherein a plurality of optical signals is radiated in from different solid angles, wherein the aperture of the photodiode is chosen in such a way that the normalized intensity of the interference signal of incident optical signals from solid angles outside a specified solid angle resolution is not greater than 0.1 or greater than 0.05.

2. The method according to claim 1, wherein the optical signal and the reference signal are radiated into the photodiode substantially collinearly.

3. The method according to claim 1, wherein the first side faces away from the second side.

4. The method according to claim 1, wherein the first side is formed by a substrate of the photodiode or a semiconductor layer of the photodiode arranged on a substrate.

5. The method according to claim 4, wherein at least one of the optical signal and the reference signal (LO) is radiated in at an angle relative to the substrate or the semiconductor layer.

6. The method according to claim 1, wherein the wavelengths of the optical signal and the reference signal are at least approximately the same.

7. The method according to claim 1, wherein the optical signal and the reference signal are produced by means of the same optical light source.

8. The method according to claim 1, wherein the wavelengths of the optical signal and the reference signal are different and their differential frequency maximally corresponds to the 3 dB cut-off frequency of the photodiode or is greater than the 3 dB cut-off frequency of the photodiode.

9. The method according to claim 1, wherein the optical signal and the reference signal are radiated into the photodiode such that they interfere with each other at least in an absorber layer of the photodiode.

10. The method according to claim 1, wherein the reference signal is radiated in via an adjustable deflection unit, wherein the photodiode registers an interference signal produced by the interference of the optical signal with the reference signal, which substantially depends on a fraction of the optical signal that is incident on the photodiode collinearly to the reference signal.

11. The method according to claim 1, wherein the photodiode has an aperture which amounts to at least 0.5 mm.

12. The method according to claim 1, wherein there is provided an array of photodiodes, wherein at least one optical signal is each radiated into the photodiodes via the first side or the second side, wherein the reference signal is each radiated in via the other side of the photodiodes, wherein each of the photodiodes registers an interference signal produced by the interference of the optical signal with the reference signal, which substantially depends on a fraction of the optical signal which is incident on the photodiode collinearly to the reference signal.

13. A photodiode device for the coherent detection of at least one optical signal, comprising:
at least one vertically illuminable photodiode; and
a light irradiating device for radiating the optical signal and a reference signal into the photodiode in such a way that the two signals at least partially interfere with each other,
wherein the light irradiating device is configured such that the optical signal entering into or impinging on the light irradiating device is radiated into the photodiode via a first side of the photodiode and the reference signal entering into or impinging on the light irradiating device is radiated into the photodiode via a second side of the photodiode, or, vice versa, the reference signal is radiated in via the first side and the optical signal is radiated in via the second side,
wherein for spatially scanning the optical signal the reference signal is radiated in at different angles relative to the first or second side of the photodiode and for each of the angles an interference signal is registered by the photodiode, or
wherein a plurality of optical signals is radiated in from different solid angles, wherein the aperture of the photodiode is chosen in such a way that the normalized intensity of the interference signal of incident optical signals from solid angles outside a specified solid angle resolution is not greater than 0.1 or greater than 0.05.

14. The photodiode device according to claim 13, wherein the light irradiating device comprises a first deflection device for deflecting the optical signal or the reference signal and a second deflection device for deflecting the reference signal or the optical signal.

15. The photodiode device according to claim 14, wherein the light irradiating device comprises a waveguide for guiding the optical signal or the reference signal, wherein the first deflecting device is formed by an end face of the waveguide.

16. An array with a plurality of photodiode devices according to claim 13.

17. The array according to claim 16, wherein the light irradiating devices of the photodiode devices are designed and arranged such that the photodiodes of several of the photodiode devices can be illuminated with the same reference signal.

* * * * *